March 20, 1973  V. N. CORY  3,721,572
PRESERVATION OF OLIVES
Filed July 30, 1970
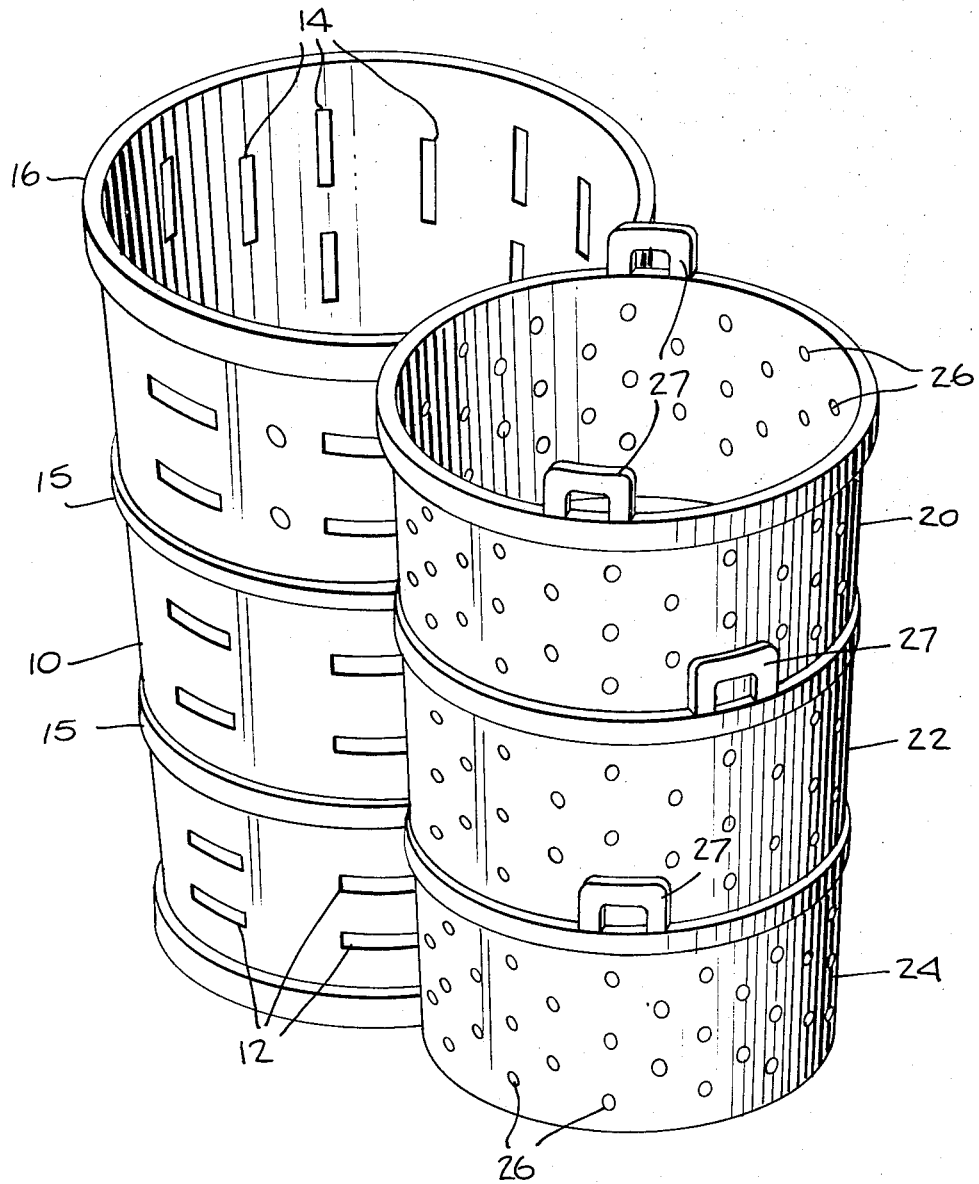
INVENTOR.
Victor N. Cory
BY
Ward McClennon Brooks Fitzpatrick
ATTORNEYS

United States Patent Office 3,721,572
Patented Mar. 20, 1973

3,721,572
PRESERVATION OF OLIVES
Victor N. Cory, 465 W. 23rd St.,
New York, N.Y. 10011
Filed July 30, 1970, Ser. No. 59,657
Int. Cl. A23b 7/02, 7/04
U.S. Cl. 99—197
13 Claims

ABSTRACT OF THE DISCLOSURE

Processes for preserving foods which comprise subjecting a brine food, such as olives, to a gaseous medium having a temperature of from about 160° F. to about 180° F. to evaporate the free surface moisture on the food, chilling the dried food to a temperature of from about 26° F. to about 33° F. with a blast of a gaseous medium having a temperature of from about 20° F. to about 30° F., and maintaining the chilled food at a temperature of from 26° F. to 35° F. by circulation of a gaseous medium over the food; as well as products obtained thereby.

BACKGROUND OF THE INVENTION

The present disclosure relates to improved processes for the preservation of brine-treated foodstuffs and to the improved products obtained thereby.

There is a continuing search for means of preserving foodstuffs to maintain their nutritional value, their visual appeal and organoleptic properties, and their wholesomeness and freedom from harmful decomposition products. As is well-known in the art, a wide variety of means of preservation have been used. Such means include freezing, pickling, refrigerating, dehydrating or drying, freeze-drying or lyophilizing, sterilization (e.g., canning), coating, candying, and the like. Each type of foodstuff has its own particular properties, and no one method of preservation is satisfactory for all types of foods. Thus, while potatoes can be drum-dried or coffee can be spray-dried or freeze-dried to provide a substance to which only water need be added, such processing would be generally unsatisfactory for preserving strawberries. Moreover, for certain foods a particular means of preservation may be too costly in view of the original value of the product, or a cheaper preservation process may be equally as satisfactory.

Olives and other foodstuffs preserved in brine are generally fruits which are picked or otherwise harvested, washed with water, treated with lye, and then soaked in brine (or pickled) to preserve them. The pickling process is generally satisfactory insofar as preservation of the particular foodstuff is concerned, but occasionally the quality and organoleptic properties of the product are impaired. Very importantly, especially for products which must be shipped considerable distances, the brine in which such foods are shipped adds substantially to the bulk of the material and results in the need for heavy casks, hogsheads, barrels, or such containers for bulk shipments. On the other hand, the shipment of such brine foods in individual consumer packs such as glass jars can be even more space-consuming and also results in great weight for the amount of product.

Cooling has long been recognized as one means of preservation, but products vary in their sensitivity to cold. For example, attempts have been made to increase the shelf-life and shipping durability of melons and lettuce by immersing the product in chilled water and subsequently maintaining it under refrigeration, as shown in U.S. Pat. 1,617,730. Such a procedure has recently been tried as a means of preserving citrus fruit, although phenylphenate preservatives have been required. There is described in U.S. Department of Agriculture, Agricultural Research Service, Marketing Research Report No. 845, the precooling of citrus fruit by means of forced air.

THE INVENTION

It has now been found that brine foods, particularly olives and the like, can be very satisfactorily preserved and maintained without the necessity for keeping them in brine or other fluid after they have been picked, washed, soaked in brine, and aged. Briefly, the processes for preserving foodstuffs contemplated by the present invention comprise (A) subjecting a brine food to a flow of a gaseous medium having a temperature of from about 160° F. to about 180° F. to evaporate substantially all of the free surface moisture on the food; (B) then blasting a gaseous medium having a temperature of from about 20° F. to about 30° F. over the food to chill the food to a temperature of from 26° F. to 35° F.; and (C) maintaining the chilled food at a temperature of from 26° F. to about 35° F. by circulation of a gaseous medium over the food. The invention also contemplates the foodstuffs and articles so obtained.

The invention is herein further described with reference to the accompanying drawing, wherein:

The figure is a view of a bulk container adapted for use herein.

The term "brine foods" as used herein means foods which are preserved by pickling or soaking in brine, after any suitable treatment to clean them, firm them, preserve their color, and the like. In the past, such foodstuffs were then maintained in brine until they are ready for serving and consumption. Such foodstuffs include pickled cocktail onions, cucumbers and like cucurbits such as gherkins, carrots, cauliflower, peppers, olives, and the like, as well as brine cherries and pineapple. Particularly preferred embodiments of the present invention are used for the preservation of olives, and the invention is herein particularly described with respect to olives, although those skilled in the art will appreciate from the present disclosure that the described processes can be applied to other brine foods, including broken, halved, sliced, and salad olives.

The olives treated according to the present processes can be unpitted or pitted, "green" olives. The invention is particularly valuable in the preservation of Spanish and Portuguese olives, since such olives withstand the sea voyage and rough handling which they must undergo quite well after the treatment taught herein. Such olives include queens (Gordales), Manzanillas, Carrasquenas, Morons, Serranas Cordovils, Perdigons, Azofairons, and the like. The olives can also be stuffed with pimientos or other customary edible materials, such as almonds, anchovies, onions, pignolia nuts, celery, and the like.

The process of the present invention further eliminates the Zapotera infection which results from weak brine or through casks which are not tightened sufficiently to stop the penetration of air to the brine. It has further been found that the pimientos with which olives are stuffed are felicitously affected by treatment according to the present invention. If the olives were stuffed and then could not be shipped, for instance by reason of order cancellation, the pimientos would tend to disintegrate, particularly from exposure to heat in the fields. When this happens, the oil in the pimiento permeates the olive and produces a most unattractive color. There is no known treatment to remove this "pimiento stain" from the olive, and the entire olive is rendered substantially unmarketable. The presently described process can be utilized to treat pimiento-stuffed olives and the product can then be kept indefinitely, either in bulk or in smaller packs.

The brine foods concerned are first treated according to conventional methods to clean and pickle them. No special preservatives or pre-treatments are required. In fact, one of the advantages accruing from the present invention is that no mold inhibitors, fungicides, or other special chemicals or preservatives need be added. Accordingly, the wholesomeness of the food is preserved without the need for costly extra materials, their precise metering into the product, and so on.

The conventionally treated brine foods are first subjected to a flow of a hot gaseous medium having a temperature of from about 160° F. to about 180° F. so that substantially all the surface water is evaporated, and temperatures of about 160° are especially preferred. The dryness of the surface contemplated in this step is the removal of the surface liquid which may be clinging to the food after it has been removed from the brine. It is not necessary totally to dry the outer surface of the food, and in fact, excessive drying is to be avoided since the properties and appearance of the food may be adversely affected. Even relatively small changes in appearance can adversely affect the saleability of the item.

At the temperatures indicated the required degree of drying can be obtained by passing air, desirably at a velocity of from 50–100 ft./min., over the food for from about one to about six minutes. At the preferred temperature in the neighborhood of 160° F., times of 3–4 minutes at gas velocities of 50 to 100 ft./min. give excellent results. This initial treatment with hot gas also has the effect of killing micro-organisms present in the food and arrests any tendency toward fermentation or other biological activity, such as might arise from insect eggs. This preliminary hot gas treatment can conveniently be carried out by passing the food under the gas stream on a conveyor belt, or by tumbling them.

At this stage the dried foodstuff can be loaded into a bulk container, such as that shown in FIG. 1; into smaller containers for individual consumption, or into containers for quantity users. Alternatively, the food can continue on a conveyor such as utilized for the drying step. It is preferred that the dried food be loaded into one of the above-mentioned containers, as appropriate, so that further handling can be minimized. This not only reduces costs, but it also tends to avoid physical damage of the food and preserves its good appearance.

The food is then subjected to blast cooling by a gaseous medium having a temperature of from about 20° F. to about 33° F. Since the temperature of the food ultimately required is from about 26° F. to about 33° F., it will be apparent that the temperature of a gaseous medium higher than this must ultimately be reduced toward the end of the chilling step and the temperature of a medium cooler than this range must be increased or the chilling must be terminated before the temperature of the gaseous medium is reached. The desired temperature range for the gaseous medium used for cooling is accordingly desirably from about 25° F. to about 30° F. In any event the food must not be permitted to form ice crystals, since this will affect the product deleteriously.

The cool gaseous medium is passed over the food at a high enough velocity to be turbulent and to cool the food relatively rapidly. Accordingly, the invention is described in terms of a "blast" of the cool gaseous medium over the food. Gas velocities over the food of from about 300 to 400 ft./min. are desirable, and velocities at the higher end of the range, namely 350 to 400 ft./min. are preferred. Velocities in excess of this can also be utilized but are not necessary.

The blast of cool gaseous medium is continued for a period of time sufficient to chill the food thoroughly. The requisite degree of cooling generally takes place for smaller articles such as cocktail onions and "select" or "petite" olives in from four to five minutes, while larger articles such as pickled cucumbers and "super colossal" stuffed olives generally require from about eight to ten minutes.

After the cooling or chilling is complete, the food is then maintained at the temperatures mentioned above until ready for use or rehydration. It is preferred to hold the food at a temperature of from 28° F. to about 33° F. As noted above, formation of ice crystals in the product must be avoided; while on the other hand, too high a storage temperature will not maintain the quality of the product. The air or other gaseous medium under which the food is stored must be circulated. As an example of the results of an undesirable storage condition, olives which are kept at the required temperature in a sealed container so that there is no circulation will become soft, turn dark, develop an off-flavor and finally become unwholesome and inedible. Thus, the advantage according to this invention would be lost.

It will be appreciated that the removal of the brine in which they are ordinarily kept will substantially reduce the weight of material to be shipped. Moreover, the use of containers as shown and/or described herein will result in further savings of weight and obviate the need to return casks and similar conventional containers for re-use. In fact, in the case of green olives such as heretofore have been packed in hogsheads or other such containers and shipped from Spain, Portugal, and similar producing areas, the containers must be left quiescent for a substantial period of time after unloading from the ship and delivery to a warehouse; otherwise they cannot be re-packed to provide a satisfactory product. This effect has been attributed to the handling of the drums, casks, or barrels during loading onto and unloading from the steamers in which they are normally shipped. Further, the continuous movement of the olives in their containers while the vessel is at sea, particularly during winter months in the North Atlantic Ocean, aggravates the problem.

The resulting condition produced in the olives has been called "seasickness" and it has been said that the olives must regain their "sea-legs." After the sea voyage packed in brine in conventional shipping containers, the olives have a raw, bitter taste. Some olives may recover in as little as two weeks, but in many instances from four to six weeks of repose in a warehouse is required before the olives reach a final cure and are in condition for marketing. The present invention permits shipping or otherwise transporting the olives in a dry packed form so that the foregoing difficulties are prevented. Those skilled in the art will appreciate from the present description that handling of brine foods in what can be regarded as a dry state will permit immediate marketing of the food on arrival at the destination and remove the necessity for expensive storage or warehousing until the foods return to or reach marketable conditions.

The term gaseous medium has been used herein to indicate that any gaseous material which is not deleterious to the food can be used. Thus, inert gases such as nitrogen, helium, or the like can be used. Air is quite satisfactory in the practice of the present process, and is the preferred gaseous medium. The pressure under which the process is carried out can be superatmospheric or somewhat subatmospheric. The use of a pressure too much below atmospheric can cause unduly low temperatures through evaporation, and is to be avoided. It is preferred to use atmospheric pressures in carrying out this process.

If desired, prior to the initial drying with hot gaseous medium, the foodstuff can first be conditioned with a cold spray of aqueous liquid, preferably water, at 50° F. to 60° F. for from one to two minutes or so. This has the advantage of cleaning the food. It is noted that the foods treated according to the present process are desirably at a temperature of 70° to 75° F. prior to treatment with the hot gaseous medium.

The cold air blast and subsequent storage have the effect of considerably reducing the moisture content of the food. Thus, olives stored according to the present invention for one week undergo about a three percent weight loss; for two weeks, about a six percent loss; and for four weeks, about a 15 percent loss. All parts, proportions, percentages, and ratios herein are by weight unless otherwise indicated.

The foods preserved according to the process described herein are rehydrated prior to consumption. Such rehydration is carried out by soaking the food in water or other aqueous liquid. It is generally desirable to rehydrate the stored product to restore the water content to its original value.

The rehydration is preferably carried out in a week brine, and the original water content can be restored by soaking overnight, or from 15 to 20 hours. The rehydration is carried out at temperatures of from about 60° to 80° F., and room temperature is generally satisfactory. It will be appreciated from the present description that the rehydration can be carried out in the containers in which the food is ultimately to be marketed.

Additional advantages accruing according to the presently described process include novel packaging methods and articles. Some of these advantages are described hereinafter with reference to FIG. 1, and others will become apparent to those skilled in the art.

The figure shows a two-element shipping container comprising outer receptacle 10 and inner containers 20, 22, and 24. Outer receptacle 10 contains circumferentially-oriented apertures 12 and axially-oriented apertures 14. Also shown are reinforcing bands 15 which strengthen the structure of receptacle 10, as well as protecting the closure ring 16 and providing for easier handling of receptacle 10.

When receptacle 10 is closed by affixing to ring 16 a perforate or imperforate cover (not shown), the structure is completely enclosed and the contents are fully protected. Receptacle 10 can be constructed of wood, metal, high-impact plastic, and the like. One particularly advantageous embodiment contemplates the use of a fiber drum which can, if desired, be provided with bands 15. Fiber drums have the advantage of being durable, light, and relatively inexpensive so that the drum need not be reused, although they can readily be reused if desired.

The receptacle 10 is used to hold inner containers 20, 22, and 24 which are provided with apertures 26. The apertures are shown as being generally circular, but any shape can be used for apertures 26 or for apertures 12 and 14. The apertures 26 are so positioned in inner receptacles 20, 22, and 24 that they are out of register with apertures 12 and 14 in receptacle 10. Thus, the contents of receptacles 20, 22, and 24 can be exposed to an ambient gaseous medium, but it is not possible for dirt or other unwanted materials to penetrate directly through apertures 12 or 14 and 26 into the brine foods.

The inner receptacles are fitted with handles or hand grips 27 in the embodiment shown so that only a portion of the total contents of receptacle 10 can be removed and rehydrated and/or repacked. It will be appreciated that a single inner receptacle can be used or that a larger number of inner receptacles can be used so that pre-measured portions of brine foods can be removed from storage and transferred to a small grocery store or institution for immediate use.

The shipping container shown in FIG. 1 can be packed with olives or other brine food directly after the initial hot air treatment of the process, and the cold air blast can then be applied. The chilled food is then maintained under the described cool storage conditions until ready for use. Thus, after loading the receptacle, no further handling of the food is required prior to use. This contrasts sharply with the prior art methods involving repeated cooperage of olives, for example, with attendant leaks in the barrels or other containers, broken barrels, the need to return the relatively heavy and expensive shipping containers, the need for additional fermentation and/or holding to eliminate the activity of microorganisms, and so on. Moreover, the present invention obviates the expense of shipping large quantities of brine with the desired products.

The same advantages can be obtained with smaller bulk containers for quantity users or with packages for use directly by the consumer. It will be appreciated that the appropriate containers utilized with the process and product of this invention enables small supermarkets, grocery stores, and the like to pack brine foods on their own premises into individual consumer containers and then to market them directly. The savings in transportation of bulky, breakable, filled containers is accordingly obviated, and new fields of use are thereby opened for such foods.

It can be readily appreciated from the present disclosure that the processes described herein provide a novel product, namely, brine foods which are in a cooled and dried state. Such novel foods, as taught above, are readily rehydrated, with or without additional brine, to provide a product having all the good features of conventionally prepared brine foods, but with great savings in transportation, packaging, and marketing.

The following examples are given to illustrate embodiments of the invention as it is presently preferred to practice it. It will be understood that these examples are illustrative, and the invention is not to be considered as restricted thereto except as indicated in the appended claims.

Example I

One thousand pounds of Manzanilla olives are picked and immersed for two minutes in a 1½ percent lye at 400° F. This results in the lye penetrating about three-fourths of the distance from the skin to the pit and substantially reduces the bitterness of the olive. The olives are then aged for two months in casks charged with brine having a 40° Salometer reading. Brine is added as necessary to make up evaporation losses. The olives are removed from the casks, graded, and returned to the casks. The casks are closed and permitted to set to arrest any growth of micro-organisms.

Pimientos are conventionally prepared, washed, soaked in brine, washed, and sliced into strips. The graded olives are removed from the casks, pitted, and stuffed with the pimiento strips.

The stuffed olives are then washed on a conveyor and surface-dried under circulating hot air at 160° F. for three minutes. The surface-dried olives are loaded into drums of the type shown in FIG. 1, each drum holding about 240 pounds of olives.

The containers are then introduced into a blast of 28° F. air having a velocity of 375 ft./min. until the temperature of the content is reduced to 33° F. The containers are then transferred to a warehouse having a temperature of 33° F. and held under circulating air. The olives can then be loaded onto ships, trains, or other appropriate means of transportation and delivered to the area where they are to be consumed. By this time, the stuffed olives will have lost about 20% of their original weight.

Prior to sale and use, the containers are opened and the olives are soaked in their weight of water overnight at about 70° F. At this point they can be consumed, distributed to commercial users, or repacked in conventional consumer packages, as desired. In any event, they are found to have excellent taste and color.

Example II

Forty pounds of each of the following lots of olives are washed in cold water:

Stuffed Fina Manzanillas, stuffed with roasted red peppers, count 340–260/kg.
Stuffed Moron olives, count 280–300/kg.
Pepper stuffed Queens, stuffed with roasted red peppers, count 80–90/kg.

Pepper stuffed Queens, stuffed with roasted red peppers, count 130–140/kg., and 30 pounds of each of the following are so treated:
Broken Salad Manzanilla olives with 20% roasted red peppers, mixed sizes.
Broken Salad olives (from Queen olives stuffed with roasted peppers), mixed sizes.
Manzanilla olives, stuffed with blanched orange peppers.

All of the foregoing lots of olives, except the whole Queen olives, are then subjected to a blast of hot air at 160° F. for three minutes. The Queen olives are subjected to the 160° F. air blast for four minutes.

Each lot of olives is then placed in a set of two corrugated paper cartons, both of which contain apertures to permit the passage of gaseous medium through the cartons and their contents. The cartons are so designed that the apertures in the inner and outer cartons are not in register, that is, gaseous medium can pass into and through the cartons but it is not possible for the medium to pass from the outside of the outer carton to the inside of the inner carton without taking a tortuous path.

Each container of olives is then placed in a walk-in refrigerator with circulation of air by fans to provide a flow of 375 to 400 ft./min. over the olives. The temperature of the air in the refrigerator is 31°–32° F. The containers of olives are stacked with spaces between the rows, so this air has free access between stacks.

After a thirty-day storage period during which the olives are maintained at 30°–32° F., samples are taken from the top, center, and bottom of each container. The stuffed whole olives are weighed and then placed in a brine solution overnight. Reweighing the next day shows a minimum of 15 percent regain for the smaller olives and 15–18 percent regain for the stuffed Queen olives.

Visual examination shows the olives to be in good condition with an attractive appearance. The taste of the olives is also good and shows them to be equal after rehydration in all respects to conventionally processed olives. Moreover, analysis of the green olives so stored shows that they meet the Federal Standard of Identity. For example, pH values of about 3.4 are obtained with no Salmonella or mold.

Three additional months of storage produce substantially the same results. After the initial thirty-day period there is substantially no further loss of weight. The cooled dried olives in storage do not manifest any adverse effects, and the olives (and stuffing, where present) remain substantially dry in appearance throughout the period. No water or other liquid appears in the containers.

The pimientos tend to shrink inside the olives, and some of the olives at the bottom of the containers are somewhat distorted or flattened; however, both of these conditions disappear upon rehydration in brine. The olives are resilient and tasty when eaten.

It will be appreciated from the present disclosure that similar results are obtained through the use of other brine foods in the process. Thus, cocktail onions, gherkins, pickled cucumbers, peppers, and pickled jardiniere products can also be so treated.

What is claimed is:

1. A process for the preservation of foodstuffs which comprises (a) subjecting olives to a flow of a hot gaseous medium having a temperature of from about 160° F. to 180° F. to evaporate substantially all the free surface moisture from said olives; (b) subsequently chilling the olives to a temperature of from about 26° to 35° F. with a blast of a gaseous medium having a temperature of from 20° F. to 30° F.; and (c) maintaining the chilled olives at a temperature of from 26° F. to 35° F. by circulating a gaseous medium around the olives.

2. A process according to claim 1 wherein the olives are pitted.

3. A process according to claim 2 in which the olives are stuffed with pimiento.

4. A process according to claim 1 in which the olives are green olives.

5. A process according to claim 2 wherein the olives are stuffed with pimientos, almonds, anchovies, onions, pignolia nuts, or celery.

6. A process according to claim 1 wherein the gaseous medium is air.

7. A process according to claim 1 carried out under atmospheric pressure.

8. A process according to claim 1 wherein the olives are washed prior to subjecting the olives to the hot gaseous medium.

9. A process according to claim 1 wherein the cold medium is blasted over the olives at a velocity of from 350 to 400 ft./min.

10. A process according to claim 1 wherein the chilling and maintaining are carried out in a perforate container.

11. A process according to claim 1 wherein subsequent to step (c) the chilled olives are soaked in an aqueous medium to restore the water content of the olives to its original value.

12. A process according to claim 11 wherein the aqueous medium has a temperature of from 60° to 90° F.

13. A process according to claim 11 wherein the aqueous medium is brine.

References Cited

UNITED STATES PATENTS

| | | | |
|---|---|---|---|
| 1,695,489 | 12/1928 | Hewett | 99—156 |
| 2,565,942 | 8/1951 | Barsky | 99—204 |
| 2,597,065 | 5/1952 | Chase | 99—156 |
| 2,825,211 | 3/1958 | Gessel | 62—62 |
| 2,834,681 | 5/1958 | Kreager | 99—102 |
| 2,228,192 | 1/1941 | Arthur | 99—207 |
| 2,583,686 | 1/1952 | De Ment | 99—156 |
| 2,615,814 | 10/1952 | Geary | 99—156 |
| 2,678,543 | 5/1954 | La Petina | 99—193 |
| 3,196,021 | 7/1965 | Oas | 99—193 |

OTHER REFERENCES

Good Housekeeping Cook Book, (ed.) Marsh, Reinart & Co., 1942, p. 407.

NORMAN YUDKOFF, Primary Examiner

M. G. MULLEN, Assistant Examiner

U.S. Cl. X.R.

99—154, 193, 104, 204